G. TANZI.
DIE CONSTRUCTION.
APPLICATION FILED DEC. 13, 1916.
1,228,495.
Patented June 5, 1917.
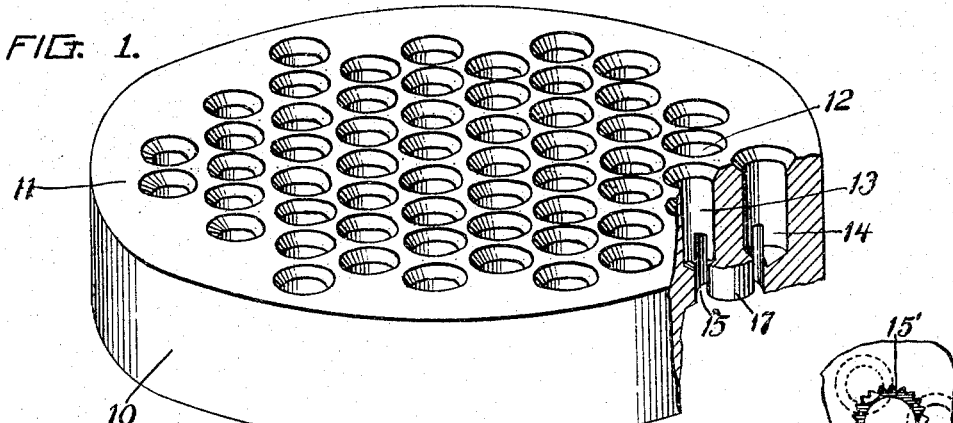
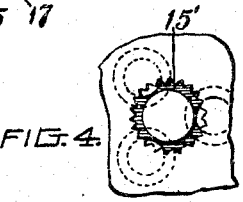
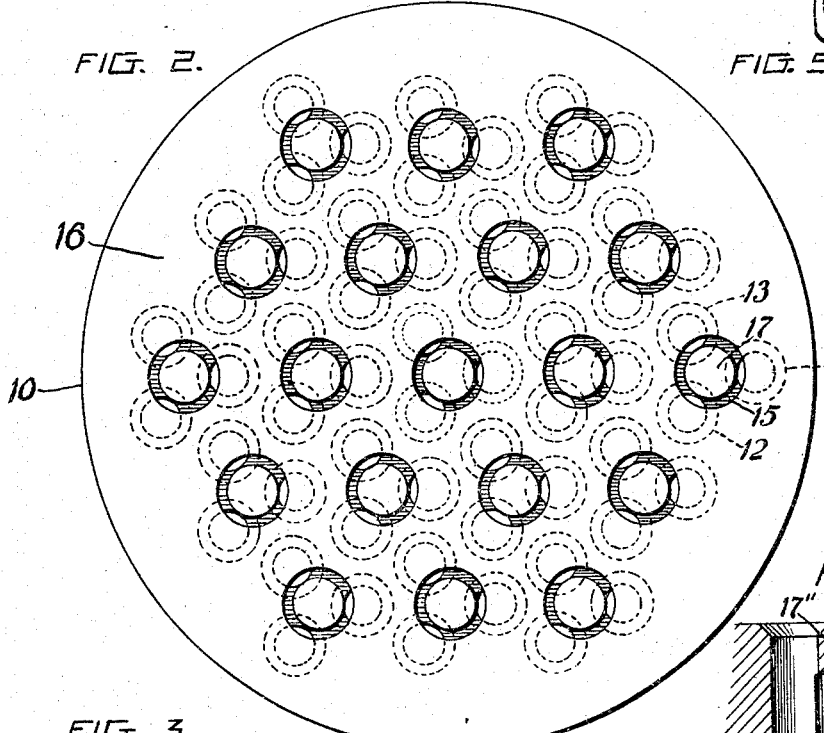
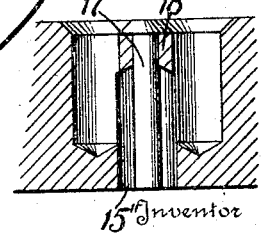
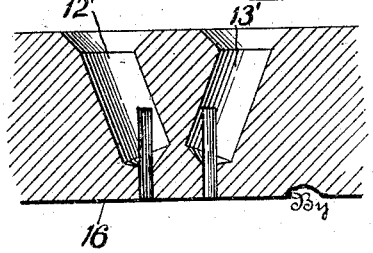
Inventor
Guido Tanzi

UNITED STATES PATENT OFFICE.

GUIDO TANZI, OF NEW YORK, N. Y., ASSIGNOR TO THE FIRM OF V. A. TANZI & SONS CO., CONSISTING OF VITO ANTONIO TANZI, AURELIO TANZI, VALENTINO TANZI, MARIO TANZI, AND SAID GUIDO TANZI, OF NEW YORK, N. Y.

DIE CONSTRUCTION.

1,228,495.      Specification of Letters Patent.      Patented June 5, 1917.

Application filed December 13, 1916. Serial No. 136,668.

*To all whom it may concern:*

Be it known that I, GUIDO TANZI, a subject of the King of Italy, and resident of New York, county and State of New York, have invented certain new and useful Improvements in Die Construction, of which the following is a specification.

This invention relates to dies adapted to the manufacture of tubular products such as macaroni and has for its principal objects the provision of a comparatively inexpensive construction which will be durable and remain accurate even after a long period of use and which will also have ample openings for the passage of the material.

Other objects and the features will be apparent from the following description and claims taken in connection with the accompanying drawings in which, Figure 1 is a perspective view of a die embodying my invention, a portion being shown in section;

Fig. 2 is a plan view of the bottom or discharge side of the die shown in Fig. 1;

Fig. 3 is an enlarged fragmentary section similar to that of Fig. 1 but illustrating another form of the invention;

Fig. 4 is a detail plan showing a fluted die opening; and

Fig. 5 is a perspective of a tube such as would be formed by the die shown in Fig. 4;

Fig. 6 is a view similar to Fig. 3 but showing another form of the invention.

Referring to the drawings, 10 indicates a circular die plate and 11 the entrance side thereof. This die plate is, generally, of the form commonly used in macaroni presses, the paste being forced through the die openings to form the macaroni. The novel feature of the dieplate is in the construction of the openings, one of which is illustrated in section in Fig. 1, being formed by three openings 12, 13 and 14 which are drilled into the plate from the entrance side 11, and which are preferably arranged in a circle. An annular opening 15, central with respect to the openings 12, 13 and 14 is drilled from the discharge side 16 of the plate and unites with the openings 12, 13 and 14 so as to form a passage through the plate. The annular opening 15 forms the mandrel 17. The holes 12, 13 and 14 may be tapered or countersunk as shown or the holes may have their axes in converging relation, as shown in Fig. 3, wherein the axes of the holes 12' and 13' converge toward the discharge side 16 of the plate. The relation of the holes is clearly shown in Fig. 2, but it will be understood that the invention is not limited to this construction since two or more holes may have communication with each annular hole 15.

When it is desired to make ribbed or fluted tubes, a suitable slotting tool is run through the annular hole 15 in an axial direction, thereby producing the form illustrated at 15' in Fig. 4.

Fig. 5 shows a tube with fluted exterior such as would be formed by the construction illustrated in Fig. 4.

Fig. 6 shows another form of the invention in which a plain hole 15" is drilled into the discharge side of the die and a separate mandrel 17" is arranged centrally therein and secured to the bridge of metal 18 between the holes in the entrance side of the die. This form of construction is especially adapted to dies for making relatively small tubes.

Having thus described my invention what I claim is:

1. A die, for forming tubular articles, consisting of a solid plate having one or more openings therethrough, each of which is formed by a plurality of adjacent openings extending into one side of the plate and communicating with an annular opening extending into the plate from the opposite side.

2. A solid tube-forming die having a plurality of slightly separated holes on the entrance side which have communication with an annular hole on the discharge side of the die whereby the material which enters said plurality of holes is all discharged through said annular hole.

3. A solid tube-forming die having one or more openings therethrough, each of which is formed by three openings arranged in a circle and extending into one side of the die and communicating with an annular opening which extends into the opposite side of the die and is centrally arranged with respect to said three openings.

4. A tube-forming die having one or more passages therethrough, for the material, each of said passages being formed by a plurality of slightly separated holes in the entrance side which communicate with a hole, central with respect thereto, in the discharge side, and a mandrel centrally arranged in the last-mentioned hole and carried by the material between said plurality of holes.

5. The method of making a solid tube-forming die which consists in drilling a plurality of openings from the entrance side of the die, and an annular opening from the discharge side and into communication with said plurality of openings.

In testimony whereof I affix my signature.

GUIDO TANZI.

Copies of this patent may be obtained for five cents each, by addressing the "Commissioner of Patents, Washington, D. C."